July 20, 1937.  J. KNOBLAUCH  2,087,600
HOOK RULE AND COMPASS
Filed Nov. 9, 1936
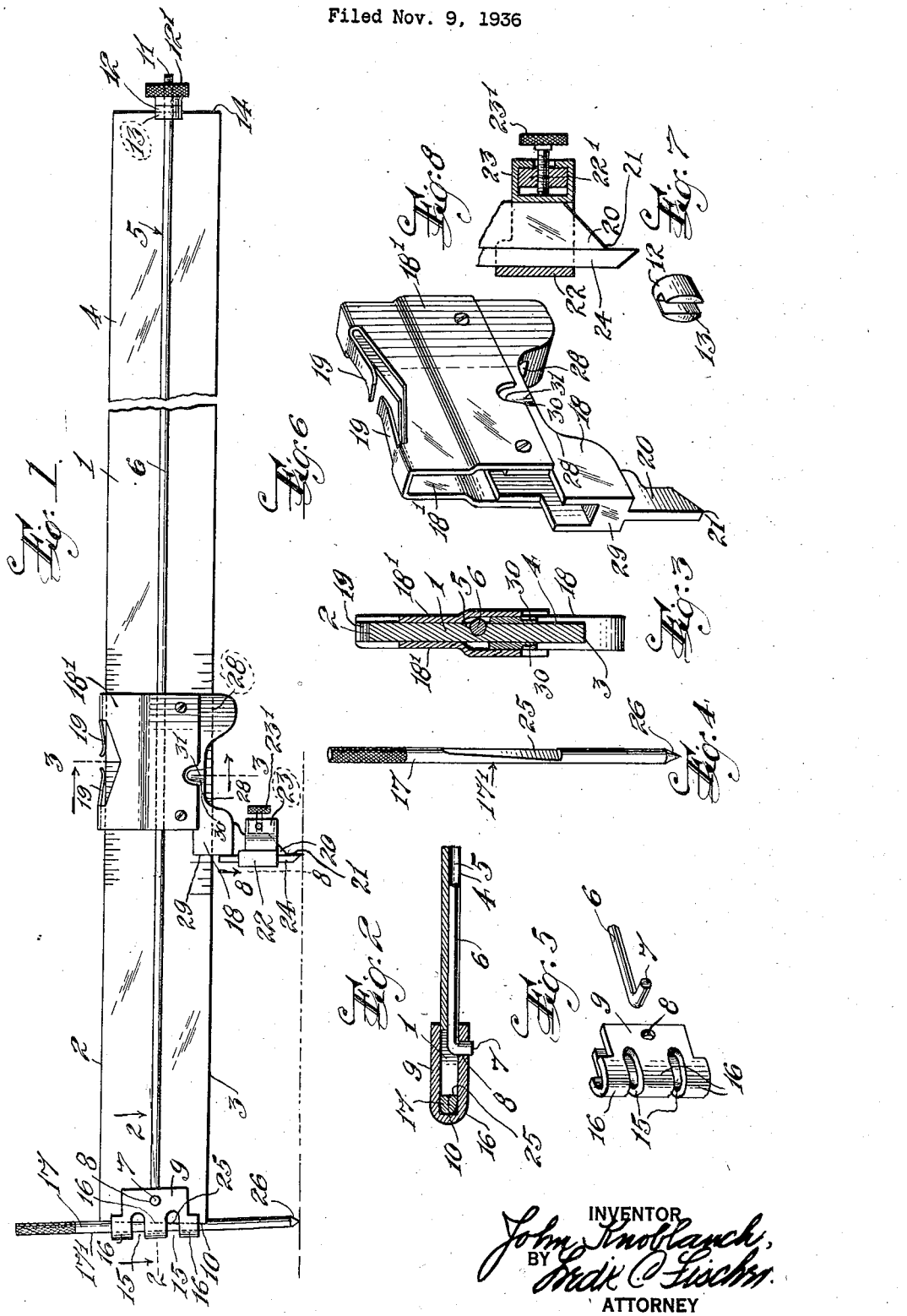

Patented July 20, 1937

2,087,600

UNITED STATES PATENT OFFICE 2,087,600

HOOK RULE AND COMPASS

John Knoblauch, Nutley, N. J.

Application November 9, 1936, Serial No. 109,879

4 Claims. (Cl. 33—27)

This invention relates to precision instruments such as are used by architects and machinists and more particularly relates to a combination hook rule and compass.

An object of my invention is to enable the ordinary steel rule to be used as a hook rule and compass.

A further object of my invention is to provide a device of the character described consisting of few and simple parts, relatively inexpensive to make, efficient and positive in operation and embodying features of precision, accuracy and stability.

A further object is to provide a device of the character described, comprising a rule provided with a longitudinal groove, a rod positioned in said groove, a channelled bracket adapted to hold a member, preferably a pin, against an end edge of the rule, said bracket being removably secured to the rod, and means engaging the other end edge of the rule and in engagement with the rod for holding said bracket and its member positively against the end edge of the rule.

A further object of my invention is to provide a device of the character described comprising a rule, a slide longitudinally movable thereon, said slide having a tongue adapted to have frictional sliding engagement with the rule, a stud depending from the slide, and a clamp engaging the stud to removably secure a line marking member thereto.

A further object of my invention is to provide a rule of the character described with a member secured to the end of the rule, and adapted to serve as either a hook or pivot, and a slide arranged on said rule and adapted to serve either as a scribable hook rule marker or scribable compass point.

These and other advantageous objects, which will later appear, are accomplished by the simple and practical construction and arrangement of parts hereinafter described and exhibited in the accompanying drawing, forming part hereof, and in which:

Fig. 1 is a side elevational view of a rule provided with my invention,

Figs. 2 and 3 are transverse, sectional views taken on lines 2—2, 3—3, respectively of Fig. 1, Fig. 4 is an elevational view of a member employed in my invention, Fig. 5 is a perspective view of the channelled bracket employed in my invention, and showing the rod fragmentarily, Fig. 6 is a perspective view of the slide employed in my invention, Fig. 7 is a perspective view of the collar, and Fig. 8 is a fragmentary, partly sectional, view taken on line 8—8 of Fig. 1.

In carrying out my invention, I utilize the ordinary steel rule 1 which is provided with unit markings adjacent the upper and lower longitudinal edges 2—3 respectively.

The face 4 of the rule is provided with a longitudinal groove 5 coextensive with the length thereof, for the reception of a rod 6. The rod 6 is provided with an upturned end 7 which passes through an aperture 8 in a channelled bracket 9 which receives the member 17 and holds the same against the end edge 10 of the rule. The other end 11 of the rod passes through a collar 12 having a transverse slot 13 to receive the end edge 14 of the rule; the end 11 of the rod is threadedly engaged by a nut 12' which draws the parts together.

The channelled bracket 9 is preferably provided with cut-out portions 15 which define arms 16 adapted to receive the member 17 and hold the same positively against the end edge 10 of the rule; the cut out portions reveal any foreign matter which might ordinarily disturb the accuracy of the device.

A channelled slide 18 is longitudinally movable on the rule, the slide has arms 18' embracing both faces of the rule and has friction means, such as spring tongues 19 slidably engaging the upper longitudinal edge 2 of the rule, to hold the slide at any predetermined position on the rule and prevent accidental displacement thereof. The slide is further provided with a depending stud 20 preferably made of hard metal, the lower edge 21 of the stud being preferably pointed.

To use the device as a hook rule, the slide 18 is moved to any predetermined marking on the rule. The edge 17' of the member 17 constitutes the hook for the rule, and the point 21 of the slide stud constitutes the scribable point of the rule for ruling lines. The slide 18 is provided with a longitudinal slit 28 through which the lower markings of the rule are visible. In using the device, the slide is adjusted on the rule so that the front edge 29 of the slide registers with the predetermined marking; the accuracy of adjustment is checked by noting whether the marking 31 of the centrally arranged recessed portion 30 of the slide registers with the center marking of that portion of the rule which is visible through slit 28 of the slide.

A separate metal point 24 may be removably secured to the stud 20 by any suitable means, such as by providing a U-shaped clamp 22 adapted to hold the metal point against the stud. The clamp 22 has a stud 22' united thereto, a gib 23 being movably arranged on the stud. The stud is longitudinally threaded to receive a screw 23' adapted to bear against the gib 23, forcing the latter against the slide stud 20 (see Fig. 8) thus securely and removably holding the clamp on the stud.

The device may be used as a compass; for this purpose member 17 is provided with a cutout portion 25, cut at an angle to receive the end edge 10 of the rule 1 as shown in Fig. 1, so that the tip 26 of the member 17 will be aligned with the end edge 10 of the rule and will constitute the pivot of the compass. A piece of lead may be removably secured to the slide stud 20 to provide the scribable point of the compass, by any suitable means, as by an arrangement like that shown for holding the metal point 24 to stud 20. The member 17 may be circular in cross section as shown in the drawing, or of any other desirable form.

The clamp 22 may be provided with any desired or convenient cam or other means, instead of the screw and toggle arrangement shown, for securing it to the slide stud 20.

The foregoing disclosure is to be regarded as descriptive and illustrative only, and not as restrictive or limitative of the invention, of which obviously an embodiment may be constructed, including many modifications, without departing from the spirit and scope of the invention, set forth in the appended claims.

Having thus described my invention, what I claim as new and desire to secure by Letters Patent, is:

1. A device of the character described, comprising a rule provided with a longitudinal groove, a rod positioned in said groove, a channelled bracket engaging one end of said rod, a member adapted to be held in said bracket against an end edge of the rule, and means engaging the other end of said rod and engaging the other end edge of the rule to positively and removably secure the parts together.

2. In a device of the character described, a rule, a channelled bracket provided with cut-out portions which define arms, a member positioned in said bracket, and means engaging the bracket and rule for positively and removably securing the member against an end edge of the rule.

3. A device of the character described comprising a rule, a bracket, a member positioned in said bracket, said member being provided with a cutout bevelled portion to receive one end edge of the rule thereby aligning the tip of the member with the edge of the rule to form a pivot, and means engaging the bracket and rule to removably secure the member against the edge of the rule.

4. In a device of the character described, a rule, a bracket at one end thereof, said bracket being provided with an aperture, a rod provided with an upturned end adapted to pass through the aperture to pivotally secure the bracket to the rod, and means engaging the other end of said rod and engaging said rule for removably securing said bracket to said rule.

JOHN KNOBLAUCH.